US008068606B2

(12) United States Patent
Schneider

(10) Patent No.: US 8,068,606 B2
(45) Date of Patent: Nov. 29, 2011

(54) EMBEDDING A SECRET IN A BIT STRING FOR SAFEGUARDING THE SECRET

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 746 days.

(21) Appl. No.: 11/897,489

(22) Filed: Aug. 29, 2007

(65) Prior Publication Data
US 2009/0060175 A1    Mar. 5, 2009

(51) Int. Cl.
*H04L 9/00* (2006.01)
(52) U.S. Cl. ............... 380/28; 380/30; 380/42; 380/44; 380/255; 380/277; 380/283; 713/150; 713/163; 713/168; 713/171; 713/180
(58) Field of Classification Search .............. 380/28, 380/30, 42, 44, 255, 277, 283; 713/180, 713/171, 150, 163, 168
See application file for complete search history.

(56) References Cited

U.S. PATENT DOCUMENTS

| | | | |
|---|---|---|---|
| 4,037,093 A | | 7/1977 | Gregg |
| 4,200,770 A | * | 4/1980 | Hellman et al. ............ 380/30 |
| 6,035,041 A | | 3/2000 | Frankel et al. |
| 6,122,742 A | | 9/2000 | Young et al. |
| 7,167,565 B2 | | 1/2007 | Rajasekaran |
| 7,200,752 B2 | | 4/2007 | Eskicioglu et al. |
| 7,707,426 B2 | | 4/2010 | Lauter et al. |
| 2003/0044004 A1 | * | 3/2003 | Blakley et al. ............ 380/28 |
| 2007/0248224 A1 | | 10/2007 | Buskey et al. |
| 2008/0260143 A1 | * | 10/2008 | Ibrahim ............ 380/28 |
| 2009/0060179 A1 | | 3/2009 | Schneider |

OTHER PUBLICATIONS

Asmuth, Charles et al., "A Modular Approach to Key Safeguarding", *IEEE Transactions on Information Theory*, vol. IT-29, No. 2, Mar. 1983, pp. 208-210.
Blakley, G. R. et al., "Safeguarding Cryptographic Keys", *National Computer Conference*, 1979, AFIPS—Conference Proceedings, vol. 48, AFIPS Press, Montvale, NJ 07645, pp. 313-317.
Blakley, G. R. et al., "Security of Ramp Schemes", *Lecture Notes in Computer Science—Advances in Cryptology, Proceedings of CRYPTO 84*, Springer-Verlag, pp. 242-268.
Shamir, Adi et al., "How to Share a Secret", *Programming Techniques, Communications of the ACM*, Nov. 1979, vol. 22, No. 11, pp. 612-613.
Schneier, Bruce, "Applied Cryptography, Second Edition—Protocols, Algorithms and Source Code in C", © 1996, John Wiley & Sons, Inc., title pages, pp. viii and 47-74.
Desmedt, et al., "Threshold Cryptosystems", Advances in Cryptology-CRYPTO 89, 1990, Springer-Verlag, pp. 307-315.
Wang, et al., "Secret image sharing with smaller shadow images", Elsevier, 2005, pp. 551-555.
Ingemarsson, et al., "A Protocol to Set Up Shared Secret Schemes Without the Assistance of A Mutually Trusted Party", Advances in Cryptology-EUROCRYPT 90, 1991, Springer-Verlag, pp. 266-282.

\* cited by examiner

*Primary Examiner* — Nabil M El Hady
(74) *Attorney, Agent, or Firm* — Lowenstein Sandler PC

(57) ABSTRACT

A method and system for embedding a secret in a bit string for safeguarding the secret. In one embodiment, the method comprises computing the length of the overall bit string as a function of q and t, where q and t are determined from the length of the secret. The method further comprises generating a plurality of information pieces based on q and t, the information pieces including a transformed secret and information for extracting the secret from the overall bit string. The method further comprises concatenating the plurality of information pieces to form the overall bit string.

24 Claims, 7 Drawing Sheets

SECRET SHARING TECHNIQUE

EMBEDDING THE SECRET IN A BIT STRING

EMBEDDING A SECRET IN A BIT STRING FOR SAFEGUARDING THE SECRET

TECHNICAL FIELD

Embodiments of the present invention relate to cryptographic techniques, and more specifically, to embedding a secret in a bit string for safeguarding the secret.

BACKGROUND

Secret sharing (or threshold secret sharing) is a cryptographic scheme that divides a secret into n pieces (or shares) such that any k of them (k<n) can be used to reconstruct the secret.

Adi Shamir discloses a technique that uses polynomial interpolations in the finite field GF(p) to construct a threshold secret sharing scheme (A. Shamir, "How to Share a Secret," Communications of the ACM, v. 24, n. 11, November 1979, pp. 612-613). George Blakley discloses a technique that uses hyperplane intersections in space to reconstruct a secret (G. R. Blakley, "Safeguarding Cryptographic Keys," Proceedings of the National Computer Conference, 1979, American Federation of Information Processing societies, c. 48, 1979, pp. 313-317). However, in the polynomial interpolation scheme, inadvertently using an extra share produces an incorrect result. In the hyperplane intersection scheme, the number of required shares is obvious, and there is no way to use too many. Thus, it is generally not possible to distribute shares without also informing the recipients how many shares are required to reconstruct the secret.

Other secret sharing techniques based on the Chinese remainder theorem, such as the Asmuth-Bloom algorithm (C. Asmuth and J. Bloom, "A Modular Approach to Key Safeguarding," IEEE Transactions on Information Theory, v. IT-29, n. 2, March 1983, pp. 208-210), have also been proposed. However, these algorithms are defined only in the integer ring and cannot be easily extended to other rings or principal ideals. Integer arithmetic is not as suited for computers as other forms of arithmetic, for example, binary arithmetic. Thus, there is a need to develop a secret sharing technique that overcomes the above inherent limitations of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
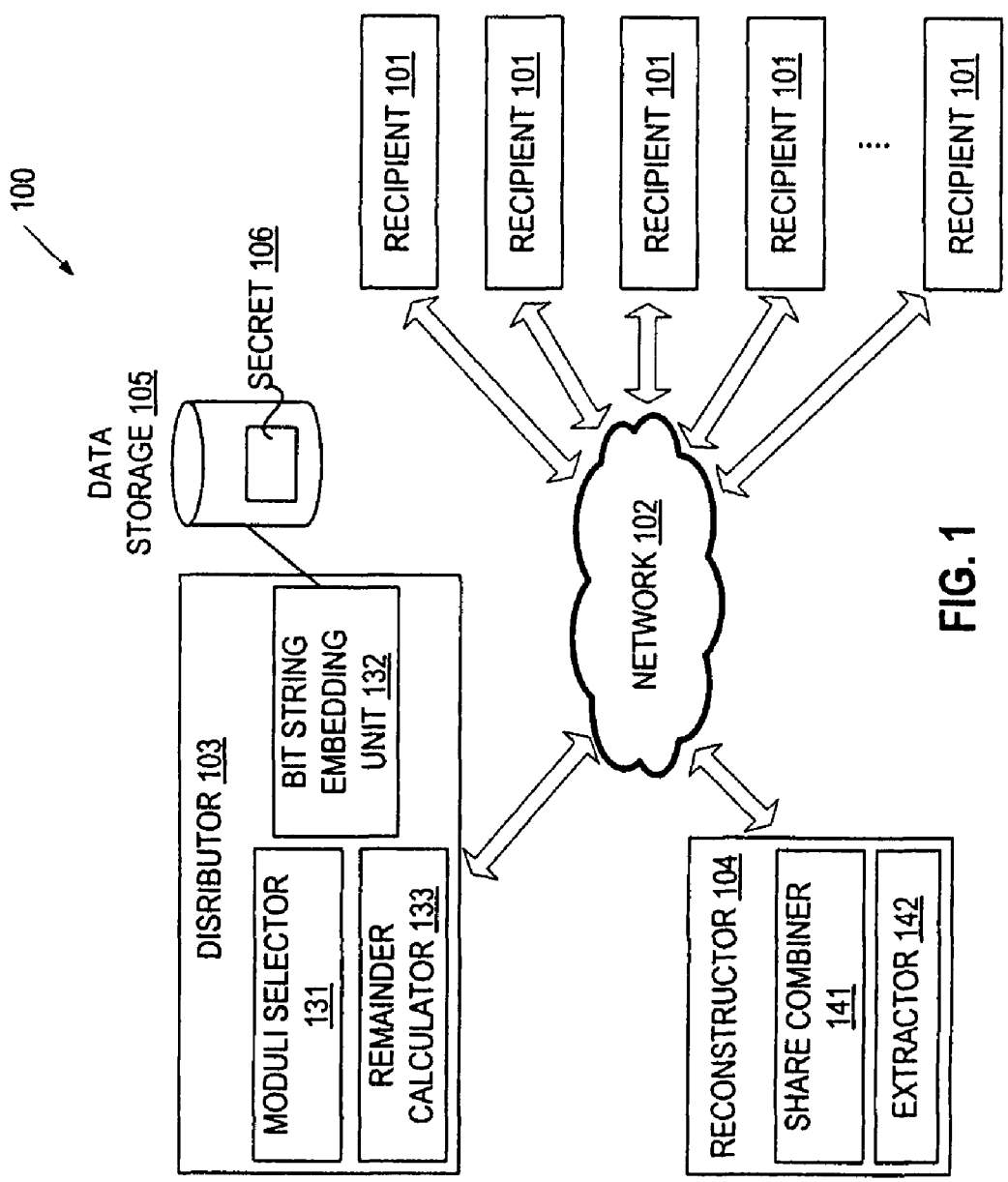
FIG. 1 illustrates a network architecture in which embodiments of the present invention may be implemented.

A method and system for embedding a secret in a bit string are described. In one embodiment, the bit string embedding technique is applied before distribution of the secret to cooperating parties. The bit string embedding technique described herein generates a plurality of information pieces based on parameters derived from the length of the secret. The information pieces include a transformed secret and information for extracting the secret from a bit string. The information pieces are then concatenated to form the overall bit string having the secret embedded therein.

The bit string embedding technique described herein extends the length of a secret such that shares of the secret are generated from moduli that have a "safe" length (e.g., at least as long as the original secret). Longer moduli increase the difficulty of brute force attacks.

Before describing embodiments of the bit string embedding technique, it is useful to provide some background regarding secret sharing. One feature of the secret sharing technique described herein is that using more than the threshold number of shares does not change the reconstructed secret. This feature makes it possible to distribute the shares without informing the recipients how many shares are needed to reconstruct the secret. If more than enough shares (i.e., greater than k shares) are used in reconstructing the secret, the result will still be the same.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "computing", "concatenating", "embedding", "determining", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a local area Network (LAN)). In one embodiment, each of the distributor 103 and recipients 101 is a computing system that manages secret information. The distributor 103 is locally coupled to data storage 105 in which a secret 106 is stored. In alternatively embodiments, the secret 106 may be stored in the main memory of the distributor. The secret 106 may be any information that can be expressed as elements in a general ring (such as the integer ring and any non-integer ring), or in a subset of a ring (such as a principal ideal). In one embodiment, the secret 106 is a cryptographic key to be jointly held in escrow by the recipients 101.

To safeguard the secret 106, the distributor 103 generates a plurality of shares of the secret 106 and distributes one share to each of the recipients 101. The secret 106 can be reconstructed from a subset of the distributed shares. In one embodiment, the cryptosystem 100 also includes a reconstructor 104 to reconstruct the secret 106 using the distributed shares. A person skilled in the art would appreciate that the reconstructor 104 may be a separate computing system as shown in FIG. 1, or, alternatively, reside in the same computing system as the distributor 103 or any of the recipients 101. The distributor 103, the recipients 101 and the reconstructor 104 may be, for example, servers, personal computers (PCs), mobile phones, palm-sized computing devices, personal digital assistants (PDAs), or the like.

In one embodiment, the distributor 103 includes a moduli selector 131, a bit string embedding unit 132, and a remainder calculator 133 to generate the shares. The reconstructor 104 includes a share combiner 141 and an extractor 142 to reconstruct the secret 106 from the distributed shares. The functions of these components will be described in greater detail below.

Figure 2:
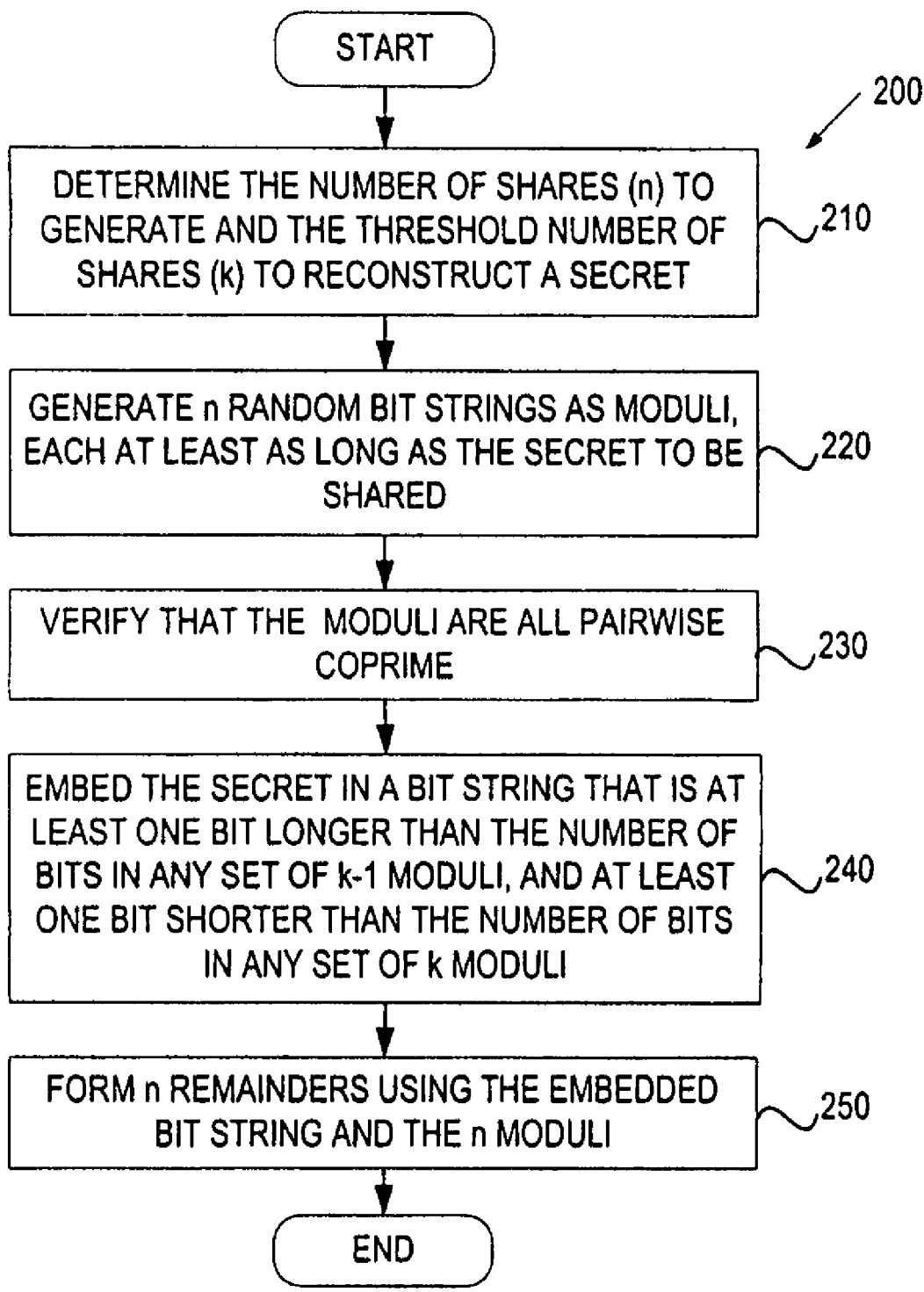
FIG. 2 is a flow diagram of one embodiment of a secret sharing process.

FIG. 2 illustrates a flow diagram of one embodiment of a process 200 for generating a plurality of shares from a secret (e.g., the secret 106). The process 200 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the process 200 is performed by the distributor 103 of FIG. 1.

Referring to FIG. 2, t block 210, the process 200 begins with the processing logic 626 determining the number of shares (n) to generate and the threshold number of shares (k) for secret reconstruction. At block 220, the moduli selector 131 generates n random bit strings (or n random elements of a ring, subring, or principal ideal), each at least as long as the secret to be shared. For example, if the secret is expressed as a bit string of s bits in length, then each random bit string has at least s bits. At block 230, the moduli selector 131 verifies that the n random bit strings are all pairwise coprime. A group of numbers $(m_1, m_2, \ldots m_n)$ are pairwise coprime if and only if any two numbers in the group have no common factor other than 1 and −1. If any of the n random bit strings is not pairwise coprime with respect to any of the other random bit strings, the moduli selector 131 replaces that random bit string with a new random bit string until all of the n random bit strings are pairwise coprime. In alternative embodiments, the moduli selector 131 may verify the property of pairwise coprime each time a random bit string of the n random bit strings is generated at block 220. In this alternative embodiment, each time the moduli selector 131 generates a random bit string, that random bit string is compared with all the previously-generated random bit strings to determine whether that random bit string is pairwise coprime with all the previously-generated random bit strings. If that random bit string is not coprime with respect to any of the previously-generated random bit strings, the moduli selector 131 replaces that random bit string with a new random bit string until the new random bit string is pairwise coprime with all of the previously-generated random bit strings. The moduli selector 131 continues the process of blocks 220 and 230 until all n random bit strings are pairwise coprime. The resulting n random bit strings will be used as moduli in the generation of shares.

At block 240, the bit string embedding unit 132 embeds the secret in a bit string that is at least one bit longer than the product of any k−1 moduli, and at least one bit shorter than the product of any k moduli. Most of the extra bits in the bit string are random, because using a predictable set of padding bits will leak information about the secret. Some embodiments of the bit string embedding technique will be described in greater detail with reference to FIGS. 4A, 4B and 5.

The bit string embedding technique extends a secret of s bits in length to an embedded secret of at least s*(k−1)+1 bits but less than s*k bits, provided that each modulus is s bits in length. The bit string embedding technique extends the secret such that each modulus can have a "safe" length (e.g., at least as long as the original secret) to increase the difficulty of brute force attacks.

The bit string embedding technique described herein is critical in the case where the secret being shared is a symmetric encryption key (typically in the range of 128-256 bits). If 64-bit moduli are used to create shares without embedding, each share effectively "leaks" 64 bits of information about the secret. Information leakage increases the possibility of success of a brute-force attack. For example, leaking 64 bits of a 128 bit key moves the brute force attack problem from the realm of "won't happen even in fantasy" to the realm of "possible with a supercomputer."

The length of the moduli is related to the number of shares intended for reconstructing the secret. If the length of each modulus is too long (e.g., several times the length of the secret), the secret may be reconstructed with fewer shares than intended (e.g., the threshold number k). If the modulus is too short (e.g., a hundredth of the length of the secret), more shares than k may be needed to reconstruct the secret.

The length of the moduli is directly related to the security of the secret. If short moduli (e.g., 128-bit moduli with a 4096 bit secret) are used, it will reduce the brute force attack solution space from the original length of the secret to however many bits that are lacking from having a complete set of k moduli. In the example of 128-bit moduli, an attacker having k−1 moduli only needs to search a space defined by a 128-bit number. Although a space defined by a 128-bit number is still an absolutely enormous space, it is nowhere nearly as big as a 4096-bit space. Thus, if the length of the secret is not extended such that each modulus is a "safe" size (e.g., at least as long as the original secret), attackers with fewer than k shares could construct a set of guesses for the secret that will allow them to find the secret faster than an exhaustive search.

At block 250, remainder calculator 133 calculates n remainders using the moduli and the secret-embedded bit string (also referred to, hereinafter, as the embedded secret). The calculation can be performed using arithmetic defined for the integer ring, any non-integer ring, or any principal ideal. For example, in the integer ring, the calculation involves integer division of the bit string with a modulus.

As the calculation performed by the secret sharing technique is well-defined in any ring or principal ideal, this technique can be used to share a secret represented as an element of any ring or principal ideal. Thus, this technique can be used in the case where the secret to be shared is interpreted as a polynomial over GF(2). Polynomials over GF(2) form a ring (a non-integer ring), which is particularly well suited to calculations performed by computers.

To reconstruct the secret from the n distributed shares, the share combiner 141 of the reconstructor 104 first combines the k or more shares it collects from the recipients 101 to reconstruct the bit string with the secret embedded therein. The extractor 142 then extracts the secret from the bit string to obtain the secret.

The share combiner 141 applies the extended Euclidean algorithm to reconstruct the embedded secret. According to the Chinese remainder theorem, there exist solutions that are congruent modulo the product of the k or more moduli used to reconstruct the secret. The extended Euclidean algorithm is well-known in the art to be applicable to any ring or principal ideal. Detailed operations of the share combiner 141 are provided in the example below.

The following example illustrates the secret sharing technique, including share generation and share combination, using moduli drawn from polynomials over GF(2). Assume that the bit string 1111 1011 0000 is a bit string with a secret embedded therein (the embedded secret), and that the secret sharing technique uses a (k, n) scheme, where k=3 (at least 3 shares to reconstruct the secret) and n=4 (4 total shares). For simplicity of illustration, binary bit strings are used in the example to represent polynomials over GF(2). Thus, the embedded secret 1111 1011 0000 represents $x^4+x^5+x^7+x^8+x^9+x^{10}+x^{11}$. It is understood that the bit string is chosen to be short for simplicity of illustration and a bit string for practical use may be hundreds or thousands of bits long.

As mentioned above, the bit string should be at least one bit longer than the product of any k−1 moduli and at least one bit shorter than the product of any k moduli. Given the length of the string is 12 and k=3, the length of each modulus is chosen to be 5 bits.

To form the moduli for secret sharing, four random bit strings that are each 5 bits long and pairwise coprime with respect to polynomial division over GF(2) are generated. An example of the four moduli is: 10010, 10011, 11001 and 11111.

Using polynomial division over GF(2), these moduli yield the following four (remainder, modulus) pairs: (1110, 10010), (1000, 10011), (1001, 11001) and (1110, 11111), where each pair represents a share of the secret. Each of the four shares is then distributed to a different one of the recipients 101.

To reconstruct the secret from any k (where, for the current example, k=3) shares (for example, the first three shares), k+1 separate products are constructed. The k+1 products include the product of all k moduli (the overall product) and each distinct product of k−1 moduli (in this example, three products of two moduli each). The distinct product of k−1 moduli is represented as a pair (excluded modulus, product). These products are 1100011000110 (the overall product), (10010, 110111011), (10011, 10100010), and (11001, 100010110).

For each of the last three products, calling the excluded modulus N and the product P, we need to find polynomials R and S such that R*N+S*P=1 (where "1" in this case denotes the constant polynomial and "*" denotes multiplication).

The critical component in each of these cases is S*P. Using the extended Euclidean algorithm, we can obtain for each of these products:

$N$=10010, $S*P$=1010 1000 1111, $N$=10011, $S*P$=1011 1001 1000, $N$=11001, $S*P$=1 0001 0110.

These S*P values are constructed such that they are congruent to 1, modulo the associated N value, but congruent to 0, modulo the other N values.

By multiplying each S*P value with the remainder associated with the excluded modulus, three multiplication results are obtained:

1110*1010 1000 1111=110 1011 0101 1010,

1000*1011 1001 1000=101 1100 1100 0000,

1001*1 0001 0110=1001 1010 0110.

The sum of the three multiplication results is 11 1110 0011 1100. Taking the remainder of the sum modulo 1 1000 1100 0110 (the overall product) produces the bit string 1111 1011 0000, which is the original bit string having the secret embedded therein.

Figure 3:
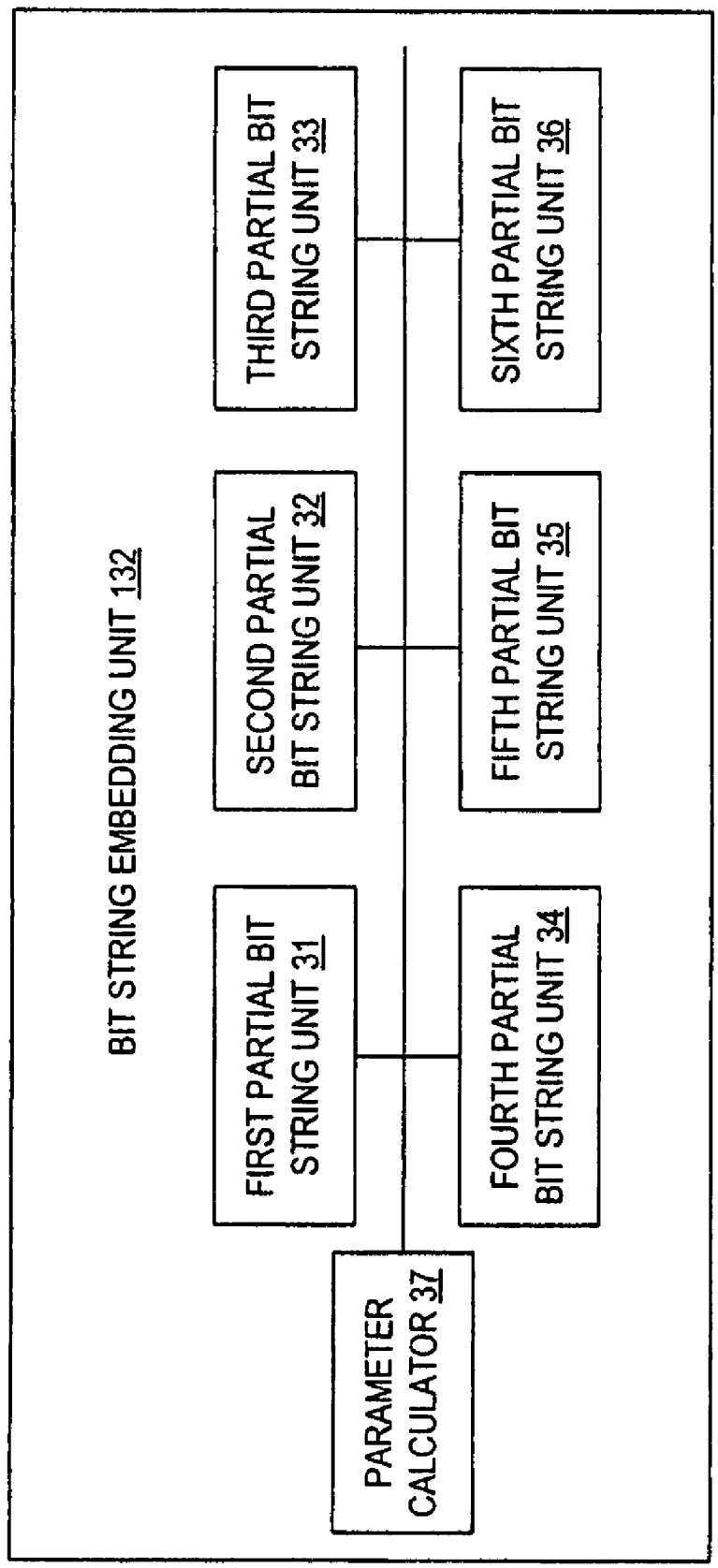
FIG. 3 illustrates a block diagram of one embodiment of a bit string embedding unit that embeds a secret in a bit string.

Having described the technique for share generation and reconstruction, the following descriptions explain, in detail, some embodiments of the technique for embedding the secret in a bit string. FIG. 3 illustrates an exemplary system of the bit string embedding unit 132 (referred to in FIG. 1) in which embodiments of the present invention may operate. In this embodiment, the bit string embedding unit 132 includes a parameter calculator 37, a first partial bit string unit 31, a second partial bit string unit 32, a third partial bit string unit 33, a fourth partial bit string unit 34, a fifth partial bit string unit 35 and a six partial bit string unit 36. Each of the partial bit string units 31-36 calculates an information piece, which are concatenated together to form an overall bit string with the secret embedded therein. The information pieces include a transformed secret and information for extracting the secret from the overall bit string. As will be described in greater detail below, the information pieces are calculated based on parameters t and q calculated by the parameter calculator 37. Some or all of the partial bit string units 31-36 includes a random bit string generator (not shown) that generates random bit strings to form the information pieces. These random bit strings come from a strong source—either a truly random source in an ideal situation, or at least a cryptographically secure source. It is understood that the embodiment described in FIG. 3 is for illustration purposes only; variation of the embodiment may include more or fewer of the partial bit string units.

Figure 4A:
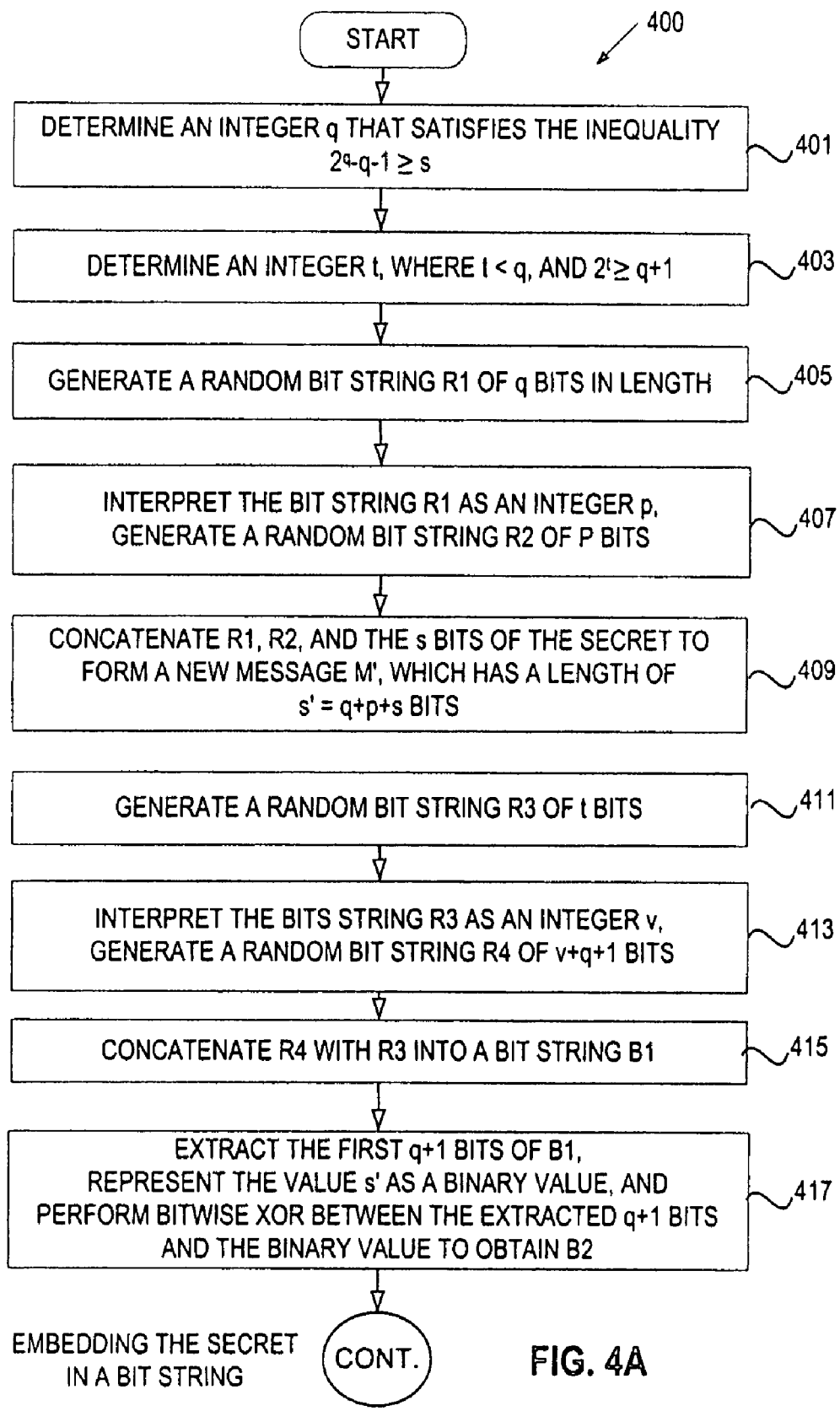
FIGS. 4A and 4B illustrate a flow diagram of one embodiment of a process that embeds a secret in a bit string.
Figure 4B:
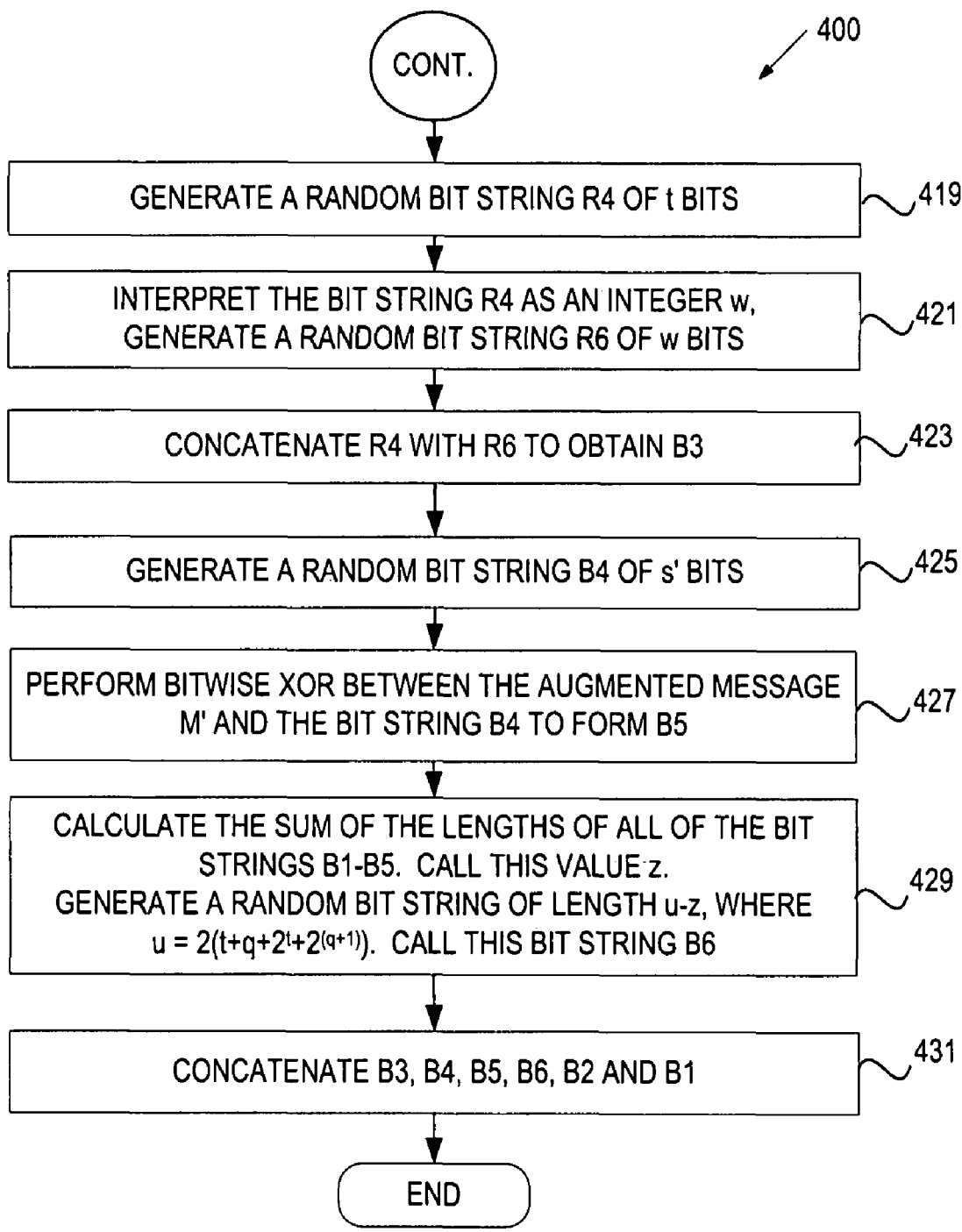

FIG. 4A and FIG. 4B illustrate a flow diagram of one embodiment of a process 400 for embedding the secret in a bit string. The process 400 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the process 400 is performed by the bit string embedding unit 132 of FIG. 1 and FIG. 3. The process 400 involves concatenation of bit strings. The concatenation operations described below are to be interpreted as taking place in the order in which the substrings are listed. For example, the phrase "concatenate A with B" would result in AB, not BA.

Referring to FIG. 4A, at block 410, the process 400 begins with the processing logic 626 determining q, which is an integer that satisfies the inequality $2^q-q-1 \geq s$, where s is the length of the original secret. As the embedded secret is going to be longer than $2^{(q+2)}$ bits, the smallest value of q is often used.

Several examples of the values of q and s are:

| q | s |
|---|---|
| 3 | 4 |
| 4 | 11 |
| 5 | 26 |
| 6 | 57 |
| 7 | 120 |
| 8 | 247 |
| 9 | 502 |
| 10 | 1013 |
| 15 | 32752 |

After the determination of q, at block 403, the processing logic 626 determines a parameter t that is less than q, but large enough such that $2^t \geq q+1$. The total length u of the overall bit string will be at least $2(t+q+2^t+2^{(q+1)})$. The exact length of the overall bit string may be dependent on k, the threshold number of shares for reconstructing the secret. For example, embedding a 128 bit secret with minimal q and maximal t (q=8, t=7) gives a u value of 1310. If k value is more than 10, the bit string of 1310 bits would be too short to generate enough shares of the required length. Thus, in this example, u may be longer than 1310.

Proceeding to block 405, the processing logic 626 computes information pieces B1 to B6. In the embodiment of FIG. 3, each of the partial bit string units 31-36 computes one of the B1-B6. First, the processing logic 626 generates a random bit string (R1) of q bits in length. At block 407, the bit string (R1) is interpreted as an integer, p. Subsequently, a bit string (R2) of p cryptographically random bits is generated.

At block 409, the random bit strings R1, R2, and the secret (of s bits) are concatenated to form an augmented secret M', which has a length of s'=q+p+s. The operations of block 407-409 convert the secret into a longer augmented secret, which no longer has any byte or word alignment.

At block 411, the processing logic 626 generates a random bit string (R3) of t bits in length. At block 413, the bit string (R3) is interpreted as an integer, v. Subsequently, a random bit string (R4) of length (v+q+1) is generated. At block 415, the random bit string R4 is concatenated with R3 to form a bit string B1. The operations of blocks 411-415 generate a trailing portion (B1) of the overall bit string that can be easily stripped off.

At block 417, the processing logic 626 extracts the first (q+1) bits from B1. Representing the value s' as a binary value, a bitwise XOR operation is performed between the extracted (q+1) bits and the binary value to obtain a bit string B2. The operations of block 417 generate an additional trailing portion (B2) of the overall bit string, and, together with the first (q+1) bits of B1, provides the length (s') of the augmented message.

Continuing to block 419 of FIG. 4B, a random bit string (R5) of t bits in length is generated. At block 521, the random bit string is interpreted an integer, w. Subsequently, a random bit string (R6) of w bits is generated. At block 423, the random bit strings R5 is concatenated with R6 to form a bit string B3. The operations of blocks 419-423 generate a leading portion (B3) of the overall random bit string that can be easily removed.

Proceeding to block 425, a random bit string (B4) of length s' is generated. At block 427, a bitwise XOR operation is performed between the augmented message M' (of block 409) and the random bit string B4 to form a transformed secret B5. Blocks 425-427 effectively generate a one-time pad key for the secret, and encrypt the secret using this key.

At block 429, the sum of the lengths of all of the bit strings from B1 to B5 is calculated as a value z. A random bit string of length (u-z) is generated to form B6, where $u=2(t+q+2^t+2^{q+1})$ is the total number of bits in the embedded secret. B6 is used as a padding to make the overall bit string as long as necessary.

At block 431, the information pieces (B1 to B6) are concatenated in the order of B3, B4, B5, B6, B2, B1. The concatenated result is the embedded secret. The resulting string, while not random, is effectively indistinguishable from a random string. Any random string of the same size could be interpreted as containing a secret in this manner.

The ordering of the bit strings (B4, B5 and B6) can be implementation as described above, or determined from some or all of the bits in B3, B3, and/or B1. (The three bit strings B4, B5 and B6 can appear in any order in the concatenated result, as long as the extraction process is modified accordingly to take into account the different ordering of B4, B5 and B6. Further, the blocks B4 and B5 are functionally identical and interchangeable; anywhere one of them is called for, its opposite can appear (as long as both bit strings are present in the output). In fact, it is impossible to determine after the fact which of the two bit strings (B4 and B5) was generated from the other, provided that the source of random bits is truly random.

Given that B4 and B5 are functionally identical, there are effectively only three orderings: (Bx, By, B6), (Bx, B6, By), or (B6, Bx, By), where Bx and By can be either B4 and B5, respectively, or B5 and B4, respectively. It should be noted that B4, B5, and B6 are the only three information pieces that can be interchanged. By contrast, B3, B2, and B1 have to be placed in the locations specified above so that their sizes can be determined. The ordering of B4, B5, and B6 can be either predetermined in the output embedding, or permuted based on all or part of the bits in B3, B2, or B1.

For example, if bits from R4 (block 413 of FIG. 4A) are used to drive the permutation, there are at least two possible simple implementations. In the first implementation, the three distinguishable permutations are numbered 0, 1, and 2. Interpret the bits in R4 as an integer, and divide that integer by three. The remainder of the division (which is 0, 1, or 2) is used to select the permutation in the bit string embedding technique.

Alternatively, start with the sequence (B4, B5, B6), and step over the bits in R4 sequentially in groups of three. Label the initial position of B4 as A, that of B5 as B, and that of B6 as C. Interpret each group of three bits as follows: for the first bit, if it's a 1, swap A and B. If the second bit is 1, swap B and C. If the third bit is 1, swap A and C. Repeat this process for every group of three bits in R4. This alternative implementation also produces a permutation for use in the bit string embedding technique.

In the above example, bit string R4 is used because it is a purely random string with no external interpretation. The choice of bit string, however, is not limited to R4. Any or all of the bits in B3, B2, and/or B1 can be used.

Figure 5:
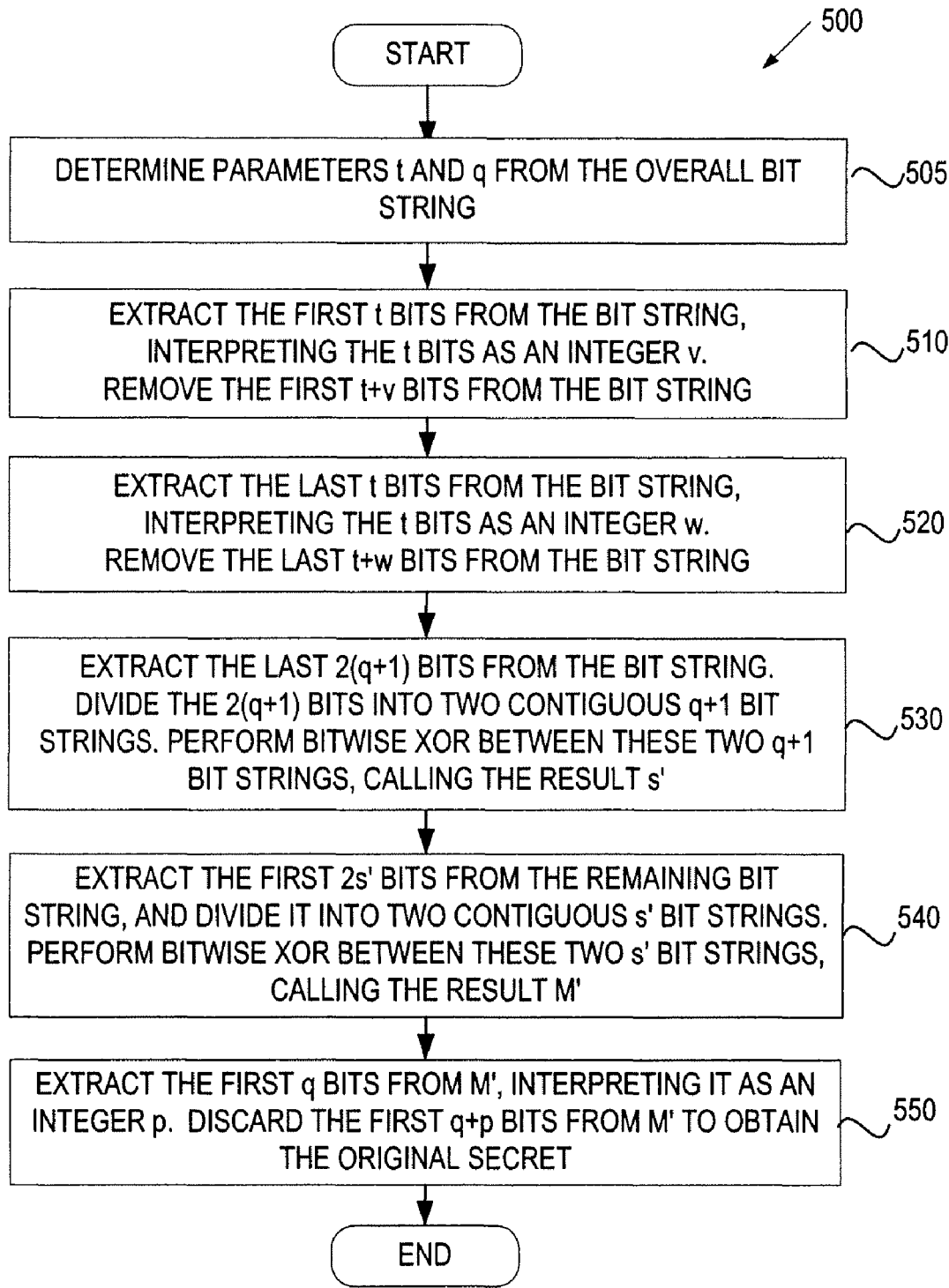
FIG. 5 is a flow diagram of one embodiment of a process that extracts the secret from the bit string of FIGS. 4A and 4B.

FIG. 5 illustrate a flow diagram of one embodiment of a process 500 for extracting the secret from the overall bit string generated in FIGS. 4A and 4B. The process 500 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the process 500 is performed by the extractor 142 of FIG. 1.

Referring to FIG. 5, at block 505, the process 500 begins with the processing logic 626 determining the parameters t and q from the length $2(t+q+2^r+2^{q+1})$ of the overall bit string, where $t<q$ and $2^r \geq q+1$. Alternatively, q and t may be communicated to the processing logic 626 independently of the embedded secret. After t and q are determined, at block 510, the processing logic 626 extracts the first t bits from the overall bit string, interpreting the t bits as an integer v. The processing logic 626 then removes the first (t+v) bits from the overall bit string.

Proceeding to block 520, the last t bits from the overall bit string is extracted and interpreted as an integer w. The processing logic 626 removes the last (t+w) bits from the overall bit string.

At block 530, the last $2(q+1)$ bits from the remaining bit string are extracted. The $2(q+1)$ bits are divided into two contiguous (q+1) bit strings, and a bitwise XOR operation is performed between these two bit strings to obtain s', which is the length of the augmented secret.

At block 540, the first 2s' bits from the remaining bit string are extracted. The 2s' bits are divided into two contiguous s' bit strings and a bitwise XOR operation is performed between these two bits strings to obtain the augmented secret M'.

At block 550, the first q bits from M' are extracted and interpreted as an integer p. Then the first (q+p) bits from M' are discarded to obtain the original secret. A skilled person in the art would appreciate that the extraction process should mirror the bit string embedding process 400 described with reference to FIGS. 4A and 4B. Thus, if the ordering of the bits strings B4, B5 and B6 are permuted in the embedding process 400, the corresponding extraction process 500 should also be adjusted to reflect the permutation.

Figure 6:
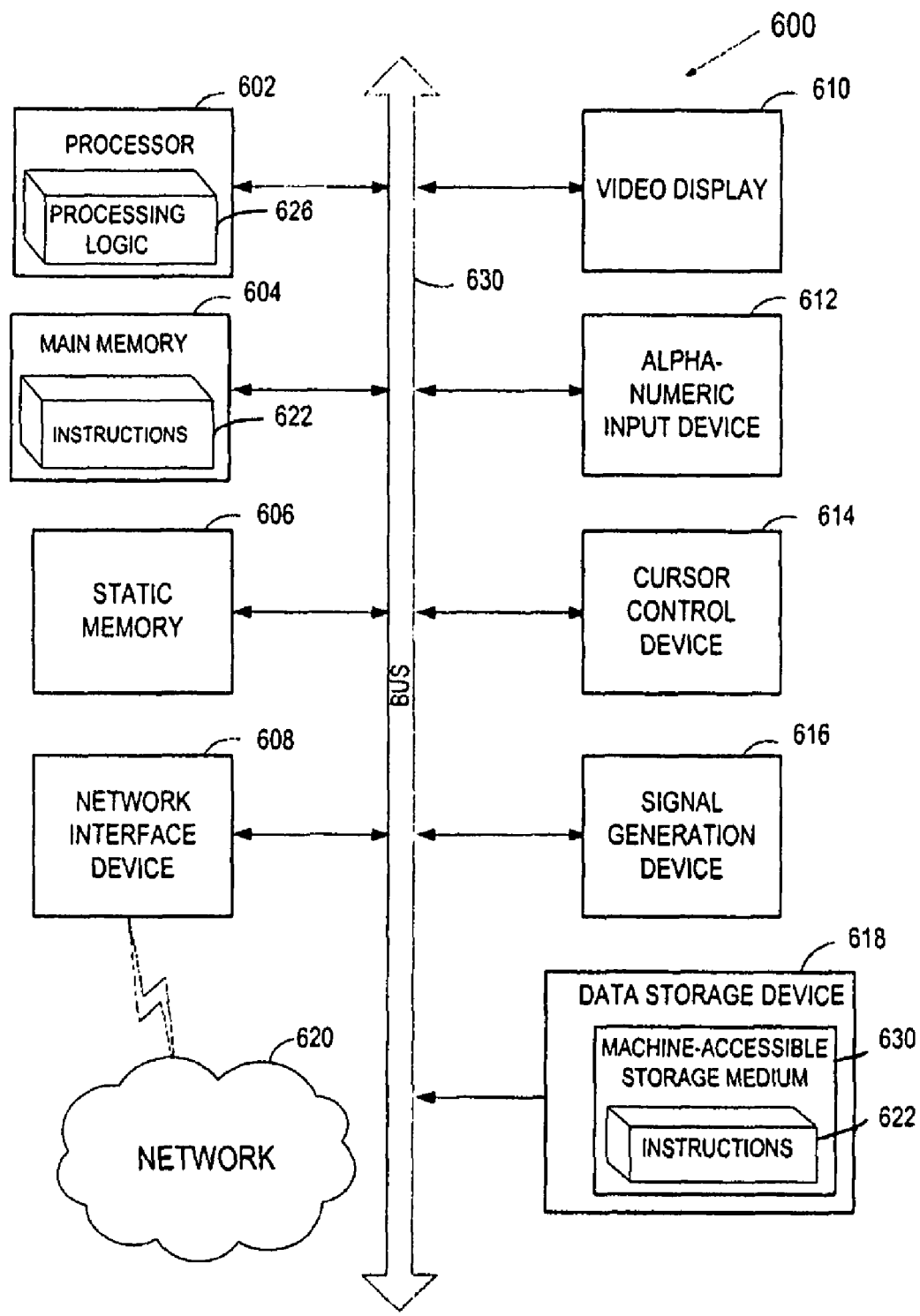
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store the secret 106 of FIG. 1. While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and system for embedding a secret in a bit string have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, implemented by a computer system programmed to perform the following, comprising:
   generating, by the computer system, an augmented secret of s' bits by concatenating random bit strings and a secret, the secret being a bit string of s bits (s<s') and representing a cryptographic key to be jointly held by cooperating computer systems;
   generating, by the computer system, a transformed secret by performing a bitwise XOR between the augmented secret and a random bit string of s' bits;
   generating, by the computer system, a plurality of information pieces based on the augmented secret, the transformed secret and additional random bit strings;
   concatenating, by the computer system, the plurality of information pieces to form an overall bit string; and
   generating N shares of the overall bit string for distribution among the cooperating computer systems to safeguard the secret
   wherein the random bit strings comprise a random bit string of q bits, and the additional random bit strings comprise a random bit string of t bits, q and t are integers satisfying: 2 (raised to the power q)−q−1≧s, t<q and 2 (raised to the power t)≧q+1.

2. The method as recited in claim 1, wherein the length of the overall bit string is at least $2(t+q+2^t+2^{(q+1)})$ bits.

3. The method as recited in claim 1, wherein the plurality of information pieces comprise a leading portion and a trailing portion of the overall bit string, each of the leading portion and the trailing portion formed by a random bit string of a variable length.

4. The method as recited in claim 1, further comprising:
   concatenating R1, R2 and the secret to form the augmented secret, R1 being a random bit string of q bits, R2 being a random bit string of p bits, q being chosen to satisfy $2^q-q-1\geq s$, p being equal to R1 when R1 is interpreted as an integer value.

5. The method as recited in claim 1, wherein generating the plurality of information pieces comprises:
   generating a first random bit string of t bits in length;
   interpreting the t bits as an integer w;
   generating a second random bit string of w bits in length; and
   concatenating the first random bit string with the second random bit string to form a leading portion of the overall bit string.

6. The method as recited in claim 1, wherein generating the plurality of information pieces further comprises:
   generating a first random bit string of t bits in length;
   interpreting the t bits as an integer v;
   generating a second random bit string of (v+q+1) bits in length; and
   concatenating the second random bit string with the first random bit string to form a trailing portion of the overall bit string.

7. The method as recited in claim 1, wherein generating the plurality of information pieces further comprises:
   encoding the length (s') of the augmented secret in a third bit string of (q+1) bits, q being, chosen to satisfy $2^q-q-1\geq s$; and
   concatenate the third bit string with a trailing portion of the overall bit string.

8. The method as recited in claim 1, further comprising:
   padding the overall bit string to a predetermined length with a padding random bit string.

9. A system comprising:
   a computer system comprising:
      a bit string embedding unit to embed a secret in an overall bit string, the bit string embedding unit to concatenate a plurality of information pieces to form the overall bit string, wherein the secret is a bit string of s bits and represents a cryptographic key to be jointly held by cooperating computer systems, the bit string embedding unit further comprises:
         a plurality of partial bit string units, each partial bit string unit to form one of the plurality of information pieces based on an augmented secret, a transformed secret and random bit strings, one of the partial bit string units to concatenate a number of the random bit strings and the secret to form the augmented secret of s' bits (s'>s), and another of the partial bit string units to perform a bitwise XOR between the augmented secret and a random bit string of s' bits to form the transformed secret; and
      a share calculator to generate N shares of the overall bit string for distribution among the cooperating computer systems to safeguard the secret; and
   data storage coupled to the computer system, the data storage comprising non-transitory computer readable storage medium to store the secret
   wherein the random bit strings comprise a random bit string of q bits and the additional random bit strings comprise a random bit string of t bits, q and t are integers satisfying: 2 (raised to the power q)−q−1≧s, t<q and 2 (raised to the power t)≧q+1.

10. The system as recited in claim 9, wherein the plurality of partial bit string units comprises:
    a first partial bit string unit to generate a first random bit string of t bits and a second random bit string of (v+q+1) bits, v being an integer value of the first random bit string, and to concatenate the second random bit string with the first random bit string to form a trailing portion of the overall bit string.

11. The system as recited in claim 9, wherein the plurality of partial bit string units further comprises:
    a second partial bit string unit to concatenate R1, R2 and the secret to form the augmented secret, R1 being a random bit string of q bits, q being chosen to satisfy $2^q-q-1\geq s$, R2 being a random bit stringy of p bits, p being equal to R1 when R1 is interpreted as an integer value, and to encode the length (s') of the augmented secret in a third bit string of (q+1) bits.

12. The system as recited in claim 11, wherein the plurality of partial bit string units further comprises:

a fourth partial bit string unit coupled to the second partial bit string unit to generate a fourth random bit string of s' bits, s' being the length of the augmented secret; and a fifth partial bit string unit coupled to the second partial bit string unit and the fourth partial bit string unit to perform a bitwise XOR operation on the augmented secret and the fourth random bit string.

13. The system as recited in claim 9, wherein the plurality of partial bit string units further comprises:

a third partial bit string unit to generate a first random bit string of t bits and a second random bit string of w bits, w being an integer value of the first random bit string, and to concatenate the first random bit string with the second random bit string to form a leading portion of the overall bit string.

14. The system as recited in claim 9, wherein the plurality of partial bit string units comprises:

a sixth partial bit string unit to generate a padding random bit string to pad the length of the overall bit string to at least $2(t+q+2^t+2^{(q+1)})$ bits.

15. A non-transitory computer readable storage medium comprising instructions that, when executed by a processing system, cause the processing system to perform a method comprising:

generating an augmented secret of s' bits from a secret of s bit (s<s'), the augmented secret obtained from concatenating random bit strings and the secret;

generating a transformed secret by performing a bitwise XOR between the augmented secret and a random bit string of s' bits;

generating a plurality of information pieces based the augmented secret, the transformed secret and additional random bit strings;

concatenating the plurality of information pieces to form an overall bit string; and generating N shares of the overall bit string for distribution among cooperating computer systems to safeguard the secret wherein the random bit strings comprise a random bit string of q bits, and the additional random bit strings comprise a random bit string of t bits, q and t are integers satisfying: 2 (raised to the power q)$-q-1 \geq s$, t<q and 2 (raised to the power t)$\geq q+1$.

16. The computer readable storage medium of claim 15, wherein the plurality of information pieces comprise a leading portion and a trailing portion of the overall bit string, each of the leading portion and the trailing portion formed by a random bit string of a variable length.

17. The computer readable storage medium claim 15, wherein the method further comprises:

concatenating R1, R2 and the secret to form the augmented secret, R1 being a random bit string of q bits, q being chosen to satisfy $2^q-q-1 \geq s$, R2 being a random bit string of p bits, p being equal to R1 when R1 is interpreted as an integer value.

18. A method, implemented by a computer system programmed to perform the following, comprising:

receiving, by a computer system, an overall bit string by combining shares of a secret that represents a cryptographic key jointly held by cooperating computer systems the secret being a bit strings of s bits;

removing, by the computer system, a leading portion and a trailing portion from the overall bit string, the lengths of the leading portion and the trailing portion determined from the first t bits and the last t bits of the overall bit string, respectively, t being a predetermined integer value;

determining, by the computer system, the length of an augmented secret (s') from last 2(q+1) bits of remaining bits of the overall bit string by dividing the last 2(q+1) bits into a first (q+1) bits and a second (q+1) bits and performing a bitwise XOR operation between the first (q+1) bits and the second (q+1) bits, q being a predetermined integer value;

determining, by the computer system, the augmented secret from first 2s' bits of the remaining bits; and removing, by the computer system, redundant bits from the augmented secret to obtain the secret, the redundant bits determined from a first q bits of the augmented secret wherein q and t are integer values satisfying: 2 (raised to the power q)$-q-1 \geq s$, t<q and 2 (raised to the power t)$\geq q+1$.

19. The method as recited in claim 18, wherein the length of the overall bit string is at least $2(t+q+2^t+2^{(q+1)})$ bits.

20. The method as recited in claim 18, wherein determining the augmented secret based on the length of the augmented secret comprises:

extracting the first 2 s' bits of the remaining bits, s' being the length of the augmented secret;

dividing the first 2 s' bits into a first s' bits and a second s' bits; and performing a bitwise XOR operation between the first s' bits and the second s' bits to compute the augmented secret.

21. The method as recited in claim 18, wherein removing redundant bits from the augmented secret comprises:

extracting first q bits from the augmented secret;

interpreting the first q bits as an integer p; and removing the first (q+p) bits from the augmented secret to obtain the secret embedded in the overall bit string.

22. A non-transitory computer readable storage medium comprising instructions that, when executed by a processing system, cause the processing system to perform a method comprising:

receiving, by a computer system, an overall bit string by combining shares of a secret that represents a cryptographic key jointly held by cooperating computer systems, the secret being a bit string of s bits;

removing, the computer system, a leading portion and a trailing portion from the overall bit string, the lengths of the leading portion and the trailing portion determined from the first t bits and the last t bits of the overall bit string, respectively, t being a predetermined integer value;

determining, the computer system, the length of an augmented secret (s') from last 2(q+1) bits of remaining bits of the overall bit stringy by dividing the last 2(q+1) bits into a first (q+1) bits and a second (q+1) bits and performing a bitwise XOR operation between the first (q+1) bits and the second (q+1) bits, q being a predetermined integer value;

determining, the computer system, the augmented secret, from first 2s' bits of the remaining bits; and removing, the computer system, redundant bits from the augmented secret to obtain the secret, the redundant bits determined from a first q bits of the augmented secret wherein q and t are integer values satisfying: 2 (raised to the power q)−q−1≧s, t<q; and 2 (raised to the power t)≧q+1.

23. The computer readable storage medium of claim 22, wherein the length of the overall bit string is at least $2(t+q+2^t+2^{(q+1)})$ bits, $2^q-q-1>s$, t<q and $2^t≧q+1$.

24. The computer readable storage medium of claim 22, wherein determining the augmented secret based on the length of the augmented secret comprises:

extracting the first 2 s' bits of the remaining bits, s' being the length of the augmented secret;

dividing the first 2 s' bits into a first s' bits and a second s' bits; and performing a bitwise XOR operation between the first s' bits and the second s' bits to compute the augmented secret.

* * * * *